United States Patent [19]

Sheem

[11] 4,408,882

[45] Oct. 11, 1983

[54] OPTICAL GYROSCOPE WITH TIME DEPENDENT WAVELENGTH

[75] Inventor: Sang K. Sheem, Springfield, Va.

[73] Assignee: The United States of America as represented by the Secretary of the Navy, Washington, D.C.

[21] Appl. No.: 280,107

[22] Filed: Jul. 2, 1981

[51] Int. Cl.³ .................. G01B 9/02; G01C 19/64
[52] U.S. Cl. ............................................. 356/350
[58] Field of Search ..................................... 356/350

[56] References Cited

U.S. PATENT DOCUMENTS

| | | | |
|---|---|---|---|
| 3,102,953 | 9/1963 | Wallace | 356/350 |
| 4,013,365 | 3/1977 | Vali et al. | 356/350 |
| 4,147,979 | 4/1979 | Baues et al. | 350/96.14 |
| 4,223,977 | 9/1980 | Papuchon et al. | 350/96.14 |

Primary Examiner—Vincent P. McGraw
Attorney, Agent, or Firm—Robert F. Beers; William T. Ellis

[57] ABSTRACT

A Sagnac rotation sensing interferometer disposed on a rotating platform for use as a gyroscope comprising a wound optical fiber light path, a beam splitter for splitting a light beam into two beams directed to traverse the optical path in opposite directions, a light source circuit for generating a light beam which is switched between two wavelengths at a switching or modulation frequency substantially higher than the speed of change of the phase due to rotation, and a detector for extracting a signal from the recombined beam interference pattern at the wavelength modulation frequency, this signal being proportional to the phase shift caused by rotation.

11 Claims, 10 Drawing Figures

OPTICAL GYROSCOPE WITH TIME DEPENDENT WAVELENGTH

BACKGROUND OF THE INVENTION

The present invention relates generally to devices responsive to angular motion or rotation, and more particularly to an inertial reference device based on the Sagnac interferometer principle for measuring the angular rate of rotation of a platform.

Rotation rate sensors are utilized in a variety of different applications including use as a rate gyroscope and a gyroscope test turntable, as well as application to tachometers for generator speed control, inertial navigation and non-magnetic compasses. In its most common application, the device is disposed in a gimbal mounting and used in the manner of a gyroscope, stabilized about one sensitive axis or about 2 or 3 mutually perpendicular sensitive axes. The device so mounted may provide a space platform stabilized with respect to the system of fixed stars and may be used either for visual aid in navigation or to supply information for actuating automatic piloting or navigating mechanisms, or for remote control of a vehicle. Alternately, the device may be mounted directly upon the frame of a vehicle to supply information in response to the rotation of the vehicle about one or more reference axes. Such information would then be utilized to actuate a computer or other device for automatic or remotely controlled navigation, or like purposes.

It has been known for some time that the Sagnac interferometer can be used to detect the rotation rate of any rotating frame. These interferometers detect rotation rates as small as 15 degree per hour or less.

In essence, the Sagnac interferometer utilizes the principles of general relativity in order to detect angular motion by means of energy circulating in a loop path subjected to angular motion having a component in the plane of the loop. The existence of a measurable effect caused by the angular motion of a given circuit path upon the transmission of electromagnetic waves in the circuit was first verified by experiments performed by G. Sagnac and A. A. Michelson.

In order to more clearly understand the prior art and the problems pertaining thereto, reference will now be made to various of the figures in the drawings appended to this disclosure. Accordingly, a brief description of the drawings in this case will now be made:

Figure 1:
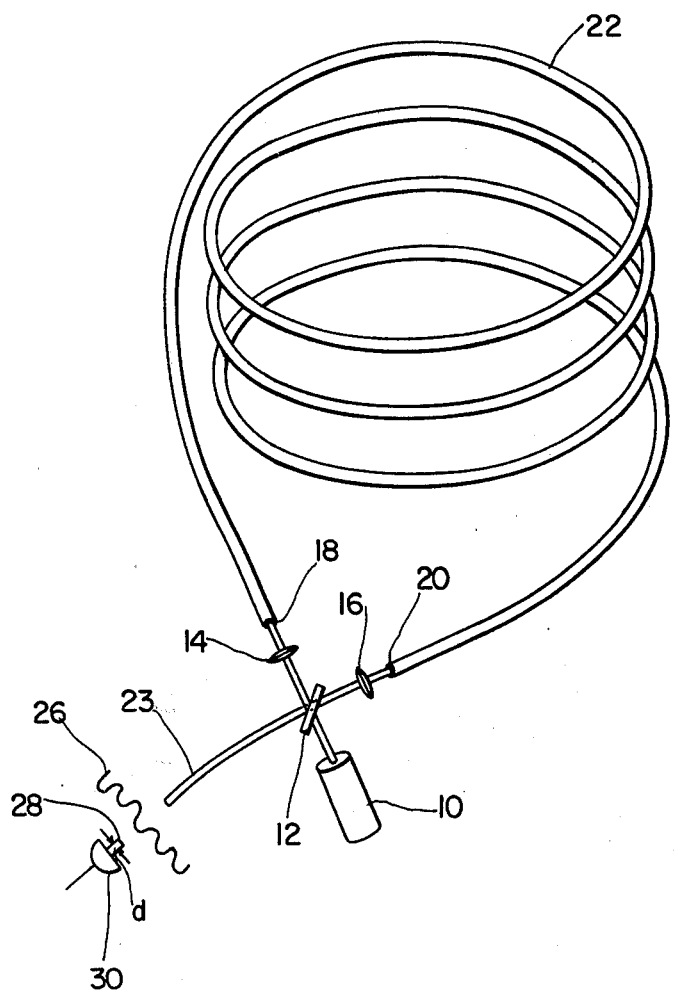
FIG. 1 is a schematic diagram of a standard Sagnac interferometer utilizing a helically wound light fiber as the light path.

Referring now to the drawings, wherein like reference characters designate like or corresponding parts throughout the views, FIG. 1 shows a typical prior art Sagnac interferometer. The assembly of FIG. 1 is mounted on a platform and is designed to sense the rotation rate of that platform. A beam of light, in this case a laser beam from a laser source 10 is split by a beam splitter 12 into two beams diverging at right angles to each other. These two beams are then focused by means of the lenses 14 and 16 into the ends 18 and 20 of a helically wound optical fiber 22. The light beam focused into the end 20 of the optical fiber 22 traverses the optical fiber light path circuit in a counter-clockwise direction, while at the same time the beam focused into the end 18 traverses the optical fiber light path circuit in the clockwise direction. When these two beams have traveled through the light path circuit in their respective directions, they are collimated by the lenses 18 and 20, respectively, and impinge upon the beam splitter 12. The two beams interfere with each other at the beam splitter 12 and form an interference or fringe pattern 26 at the end of optical fiber 23. A detector 30 with a slit 28 with a width of d is then disposed to detect a portion of this fringe pattern. Accordingly, any change in this fringe pattern will be detected by the detector 30. As noted above, it is known that if the platform on which this system is located is rotated at an angular velocity $\Omega$ in the plane in which the light beams travel, then the interference fringes will be displaced from the position which they occupy when the system is at rest. The amount of the displacement of this fringe pattern is found to be proportional to the angular velocity.

In the alternative, the beam splitter 12 and the two interfering beams may be arranged in such a way that the total optical power impinging upon the detector 30 varies with the rotation rate. More specifically, if the beams are perfectly collimated and are disposed at 45° with respect to the beam splitter, then the spacing between the interference patterns becomes infinite. Thus, the measurement of the change in the total output power will yield a figure proportional to the rotation rate. This measurement may be taken by abutting the optical fiber 23 directly against the detector 30.

It should be noted that the beam splitter 12 which is shown to be a bulk-type in FIG. 1, may be replaced by a guided-wave directional coupler. With such a device the total power received by the detector 30 will again vary with the rotation rate (R. A. Bergh, H. C. Lefevre, and H. J. Shaw "All-Single-Mode Fiber-Optic Gyroscope", Optics Letters, Vol. 6, No. 4, p.p. 198–200, April 1981).

Figure 3:
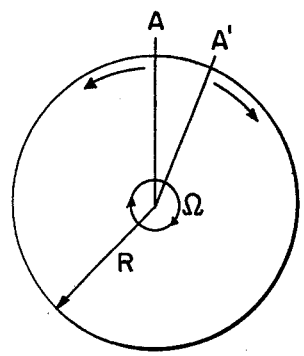
FIG. 3 is a simplified rotational diagram showing the difference in distances traveled by the two beams in the interferometer.
Figure 2A:
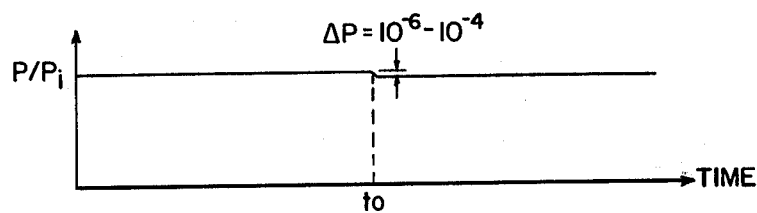
FIG. 2(a) is a graph of the theoretical normalized light power output response with respect to time of a Sagnac interferometer.
Figure 2B:
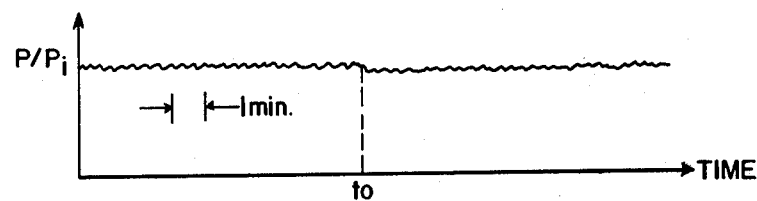
FIG. 2(b) is the actual normalized light power response with respect to time of the Sagnac interferometer.

In the conventional Sagnac interferometer shown above, the wavelength $\lambda$ of the optical beam is constant. If we assume that the interferometer begins to rotate at a time $t = t_0$, then the optical power being measured at the detector 30 will change as shown in FIG. 2(a) due to the change in the relative phase between the two beams traveling in opposite directions. In essence, the power output at the measurement point of the interference pattern is related to the phase by the following equation: assuming a unit total output, $$P = \tfrac{1}{2}, 1 - \cos(\theta + \phi),$$

where $\phi$ is a constant and $\theta$ is the Sagnac phase. The Sagnac phase change $\theta$ causing this fringe shift and thus resulting in a change in the power output at the detector 30 can be illustrated using the circular rotation diagram of FIG. 3. To begin the analysis, assume that two beams leave the point A on the circle shown in the figure at the same time to traverse the circular path 40 in opposite directions like a standard Sagnac interferometer. The time T for the light to make a circle is $$T = 2\pi R/c \tag{1}$$

where R is the radius of the circle, and c is the velocity of the light. If the frame or platform containing the circular optical path is rotating with a component of the rotation in the direction of travel having an angular rate $\Omega$ radians/second, the point A will move to the point A' by the time the two light beams have made the complete circuit around the circle. Thus, one beam will have to travel over a distance equal to $(2\pi R + S/2)$, while the other beam propagating in the opposite direction around the circle will have to travel over a distance equal to $(2\pi R - S/2)$ before each of these beams see the beam splitter 12 which is assumed to have moved from A to A' during the time T. Here S represents twice the distance between A and A'. Then, the phase difference $\theta$ between the two beams when they meet at A' is $$\theta = (2\pi/\lambda)(2\pi R + S/2) - (2\pi R - S/2)$$

$$\theta = (2\pi/\lambda)S \tag{2}$$

where the value of S is $$S = 2T\Omega R \tag{3}$$

and the rotation rate is in radians. The foregoing equations have been derived with the simple circular path shown in FIG. 3 and are actually approximated equations. However, it can be shown that these equations are very good approximations and can be generalized to any configuration.

In conventional Sagnac interferometers, the phase difference $\theta$ will remain constant so long as $\Omega$ and S remain constant in equations (2) and (3). When $\Omega$ and S change, this change will typically be very slow.

One of the major problems with the Sagnac interferometer is that rotation-caused fringe shifts will generally only cause a change in power $\Delta P$ of on the order of $10^{-6} - 10^{-4}$ P where P is the total power output. However, a significant amount of system noise will typically be present in the apparatus. This noise will frequently cause power fluctuations as large as and larger than the power change $\Delta P$ caused by the rotation fringe shift. There are a variety of potential sources of such noise in the system. For example, the laser light output is generally not constant but will fluctuate. Likewise, noise may be caused by polarization drift or from the backscattering of light as it propagates through the optical fiber. If the change in power $\Delta P$ caused by the rotation fringe shift is smaller than this drift fluctuation or other noise fluctuation, then it cannot be detected by the system. Accordingly, such noise fluctuation in the power output places a severe limitation on the use of Sagnac rotation interferometers. Furthermore, such interferometer signals are usually of low frequency ranging from a few hertz to a fraction of a hertz where noise power is relatively high.

OBJECTS OF THE INVENTION

Thus, it is an object of the present invention to significantly enhance the detectability of power changes $\Delta P$ due to rotation fringe shifts.

It is a further object of the present invention to increase the sensitivity of rotation rate interferometers in the presence of system noise.

It is yet a further object of the present invention to effectively filter out noise-caused power fluctuations at the output of a Sagnac interferometer.

Other objects, advantages and novel features of the invention will become apparent from the detailed description of the invention following the summary when considered in conjunction with the accompanying drawings.

SUMMARY OF THE INVENTION

Briefly, the above and other objects are obtained in a Sagnac rotation sensing interferometer by converting the interferometer output signal from a low frequency to a high frequency. According to the invention, the wavelength of the light propagating in the light paths of the interferometer is modulated in time at a modulation frequency substantially higher than the rate of change of phase of the light beam due to rotation and the system noise frequency spectrum. Apparatus is then included for extracting a signal from the interferometer interference pattern at the modulation rate of the optical beam wavelength in order detect the phase change therefrom. The invention is based on the fact that by varying the wavelength of the beam applied to the Sagnac interferometer at a predetermined rate, it is possible to modulate the Sagnac phase and thereby detect with significantly increased sensitivity the changes in the interference pattern signal. Accordingly, this invention permits the shifting of the spectrum of gyro signal into a region where the noise spectrum for the system is minimal.

In one embodiment of the present invention, the Sagnac rotation sensing interferometer comprises a long wound optical fiber light path, a beam splitter for splitting an input light beam into two beams and directing one of the two beams to travel in a clockwise direction around the light path circuit and directing the other of the two beams to travel in a counter-clockwise direction around the light path circuit, and for recombining the two beams after having traversed through their respective directions in the light path circuit to produce electromagnetic wave interference. This apparatus further includes a plurality of light sources for generating a plurality of different beams of electromagnetic energy with each beam having a different wavelength, a gating circuit for alternately gating each of the plurality of different wavelength beams to the beam splitter at a gating frequency substantially higher than the rate of change of phase due to rotation, and an extracting circuit for extracting a signal from the interference pattern at the wavelength switching frequency in order to detect a phase change therefrom. In operation, when there is no rotation component in the plane of the light path circuit, then the wavelength modulation will not alter the normalized interference output signal. However, if the gyroscope is in a rotating frame, then the normalized interference output signal will have a ripple at the wavelength modulation frequency with the amplitude of the ripple being proportional to the Sagnac phase change caused by the rotation component in the plane of the light path circuit.

DETAILED DESCRIPTION OF THE PREFERRED EMBODIMENT

In conventional Sagnac interferometers the rotation rate $\Omega$ and distance S are very small and change slowly. Typically, the rotation rate may be as small as 15 degrees per hour or less. Accordingly, the magnitude of the phase change $\theta$ in equation (2) is much less than a degree and changes very slowly with time.

In the present invention the fact that a change in the phase shift $\theta$ also occurs with changes in the wavelength (see equation (2)) is utilized to effectively enhance the detectability of the phase shift signal. In $\lambda$ particular, the wavelength of the input optical beam is modulated at a frequency substantially higher than the speed of change of the distance S and the noise frequencies. From equation (2) it can be seen that this wavelength modulation results in the modulation of the phase of the interferometer signal at the same modulation frequency. The effect of this wavelength modulation can be more clearly understood through the following analysis. It was previously stated that the phase change $\Delta\theta$ caused by rotation is proportional to the change in output power $\Delta P$, or $\Delta\theta = K\Delta P$ where K is a constant. Now by subtracting the phase shifts $\theta(\lambda_1) - \theta(\lambda_2)$ in accordance with equation (2) the following equation is obtained:

$$K\Delta P = \Delta\theta = \theta(\lambda_1) - \theta(\lambda_2) = 2\pi S(1/\lambda_1 - 1/\lambda_2) \quad (4)$$

Figure 2C:
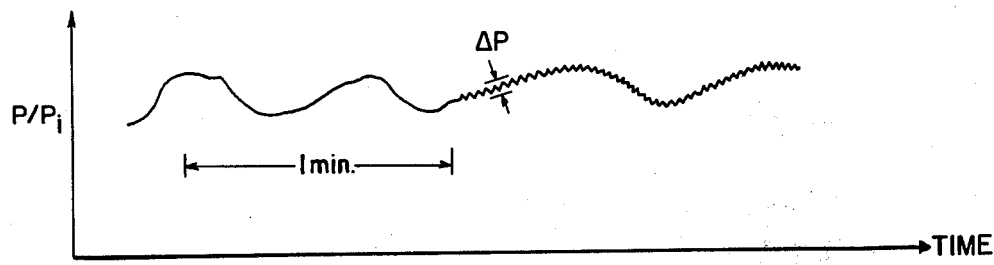
FIG. 2(c) is a graph showing a small magnified portion of the normalized power response with respect to time of the Sagnac interferometer of the present invention.
Figure 2D:
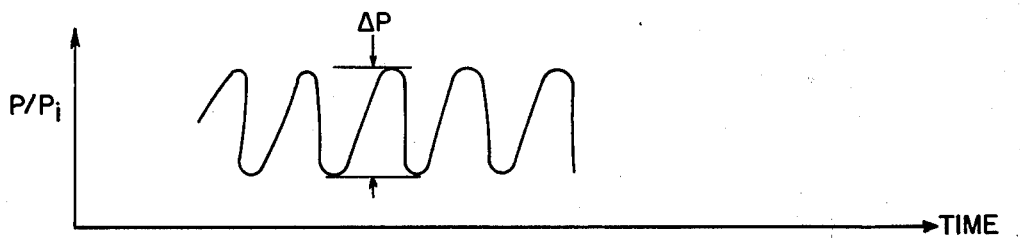
FIG. 2(d) is a graph of a magnified portion of the ripple frequency generated if there is a rotation component in the plane of the light path circuit.
Figure 4A:
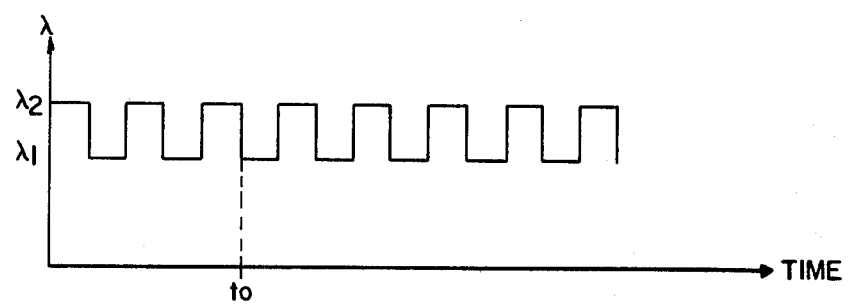
FIG. 4(a) is a graph of one possible wavelength variation with time which may be utilized to implement the present invention.
Figure 4B:
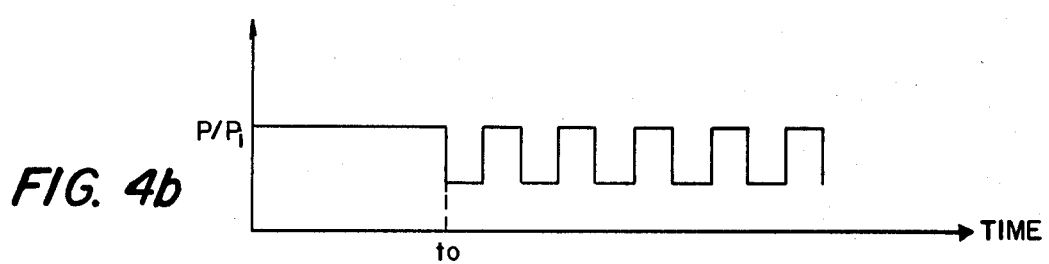
FIG. 4(b) is a graph of the normalized power response with time for the wavelength modulation shown in FIG. 4(a).

Now assume that the wavelength $\lambda$ in equation (2) varies as shown in FIG. 4(a) with time. Then, the change in the power output at the detector for the system will be proportional to the change in phase $\Delta\theta$, in accordance with the equation $P = \frac{1}{2}[1 - \cos(\theta + \phi)]$, and will vary with time as shown in FIG. 4(b). At $t < t_0$, the platform on which the system is disposed is assumed to have a zero rotational component in the plane of the light path for the Sagnac interferometer. Thus, at $t < t_0$, $\Delta\theta$ is zero in equation (4), since S is zero. However, when the platform begins to rotate at $t = t_0$, then S in equation (4) becomes non-zero, and any change in $\lambda$ will induce a change in the phase $\theta$, and thus in the power P, as shown in FIG. 4(b). Accordingly, the normalized power output will have a ripple component at the wavelength modulation frequency if there is rotation and a non-zero S (FIG. 2(c)).

Now, it should be understood that the purpose of the present invention is to determine the value of the distance S, which is directly proportional to the rotation rate of the platform on which the apparatus is located. By algebraically manipulating equation (4) the following equation may be obtained.

$$S = \frac{K\Delta P}{2\pi} \cdot \frac{1}{\frac{1}{\lambda_1} - \frac{1}{\lambda_2}} = \frac{K\Delta P \lambda_2 \lambda_1}{2\pi(\lambda_2 - \lambda_1)} \quad (5)$$

It is understood of course that $\lambda_1$ and $\lambda_2$ are known since they will be the wavelengths utilized to modulate the system. The difference in power $\Delta P$ from the Sagnac interferometer when the different wavelengths $\lambda_1$ and $\lambda_2$ are utilized can be measured quite easily by extracting from the output interference signal the signal at the wavelength modulation frequency and measuring the amplitude thereof. From the above equation (5) it can be seen that for a given set of wavelengths $\lambda_1$ and $\lambda_2$, the term on the right hand side of equation 5 is a constant times the measured change in power $\Delta P$. Accordingly, the measured change in power $\Delta P$ is directly proportional to the distance S, which, in turn, is directly proportional to the rotation rate. Thus, by simply extracting and measuring the amplitude of the ripple at the wavelength modulation frequency, an extremely accurate measure of the rotation rate of the platform on which the apparatus is disposed may be obtained.

Figure 5:
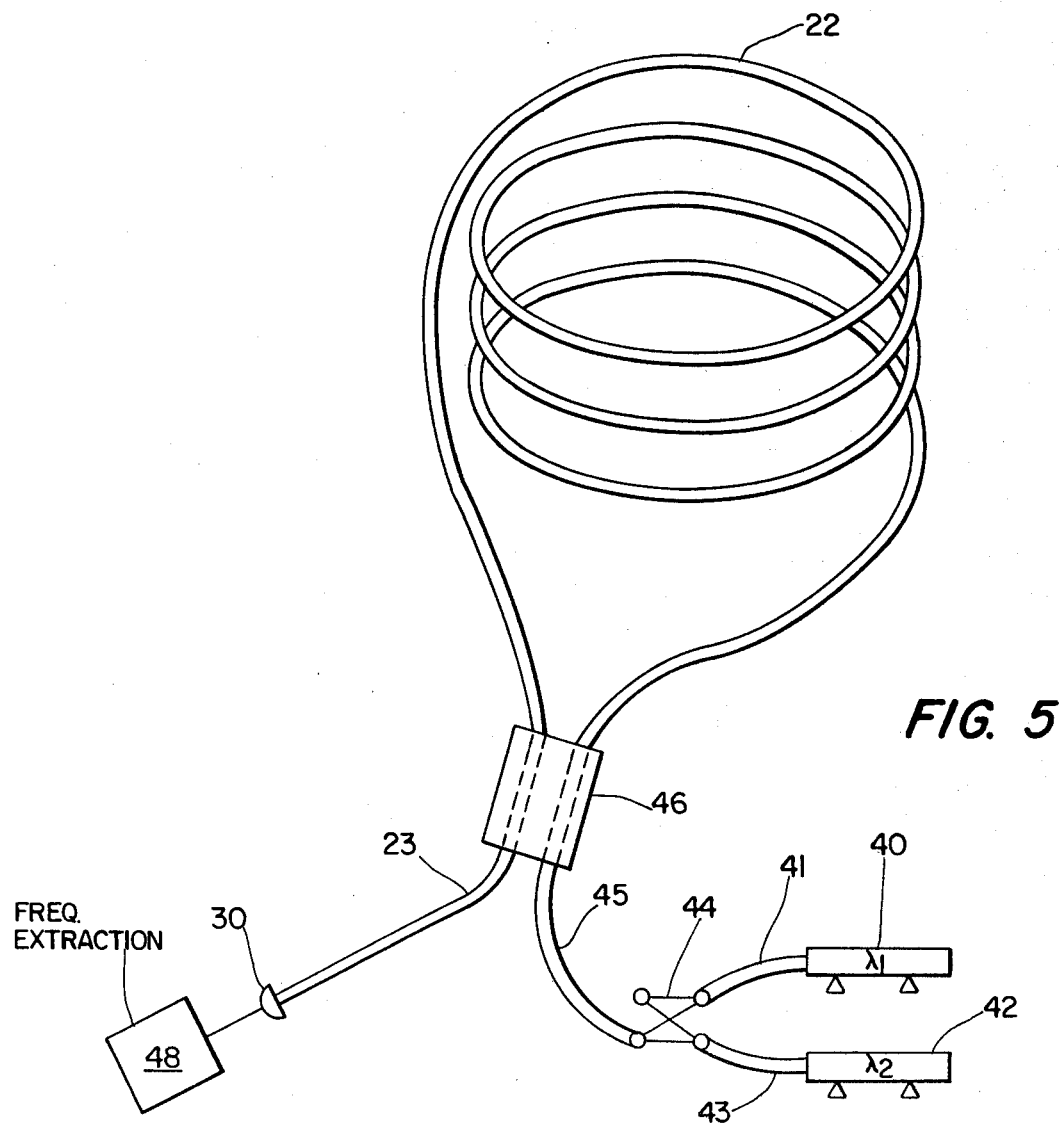
FIG. 5 is a schematic diagram of one embodiment of the interferometer of the present invention.

There are a wide variety of ways to implement the above recited teaching. One embodiment utilizing two laser sources and a modulating switch is shown in FIG. 5. In that figure, a laser source 40 for generating an optical beam with a wavelength $\lambda_1$ is applied via an optical fiber line 41 to one terminal of an optical switch 44. Likewise, a laser source 42 for generating an optical beam with a wavelength of $\lambda_2$ is applied via an optical fiber line 43 to a second terminal of the optical switch 44. By way of example, and not by way of limitation, the optical switch 44 could be implemented by means of an integrated optic directional coupler switch of the type disclosed in the article "Switched Directional Couplers With Alternating $\Delta\beta$" by H. Kogelnik and R. V. Schmidt, *IEEE Journal of Quantum Electronics*, Vol. Q.E.-12, No. 7, page 396, July 1976. This optical switch 44 will operate to alternately switch or gate the light wavelengths $\lambda_1$ and $\lambda_2$ through the optical switch 44 and the beam splitter 46 to an optical fiber light path circuit 22.

The optical fiber light path circuit 22 may again be implemented by means of a wound light fiber. The beams splitter 46 may be implemented, by way of example, by a guided-wave directional coupler of the type disclosed in U.S. Pat. No. 4,264,126.

The beam splitter 46 will operate to split whichever wavelength beam is applied thereto into two beams to travel in opposite directions through the optical fiber light path circuit 22. One beam will travel in the clockwise direction around the light path 22 while the other beam will travel in the counter-clockwise direction around the light path circuit. When these light beams of the same wavelength have traversed in their respective directions through the light path circuit 22, they are recombined by the beam splitter 46 and applied to optical fiber 23, which in turn, is butted against the detector 30. The ratio between optical powers that are divided between the fiber 23 and 45 is proportional to the Sagnac phase ($\theta$).

Since the wavelength of the input light beam is being modulated at a given rate of, for example, one KHz, by the gating circuit 44, then the normalized power output will be modulated by the same frequency, as noted above and shown in FIG. 4(b). This power output modulation at the gating frequency of the gate 44 is also shown as a ripple modulation in FIG. 2(c). This modulation signal may be extracted simply by detecting the power at the detector 30 and then extracting via an extracting circuit 48 the ripple signal present in the frequency spectrum at the position of the wavelength modulation frequency. A variety of detection techniques are available for extracting the signal at this modulation frequency. For example, the signal from the detector 30 could be applied to a spectrum analyzer or a locking amplifier. It is understood of course that the output power P must be normalized by the input power $P_i$.

In operation, when the Sagnac interferometer is disposed on a stationary platform, the wavelength modulation will not alter the normalized power output signal detected by the frequency extracter 48 because the distance S or phase shift will be zero. However, when the interferometer platform begins to rotate with a component of the rotation in the same plane as the optical light path circuit 22, then the normalized output signal will vary at the wavelength modulation rate. Thus, even though the distance S may be very small, it can be detected easily since the phase $\theta$ and thus the normalized power is modulated at a predetermined frequency which may be extracted and its amplitude measured. This modulation frequency may be arbitrarily varied up to the GHz range, but will typically be on the order of 100–10,000 Hertz.

Figure 2E:
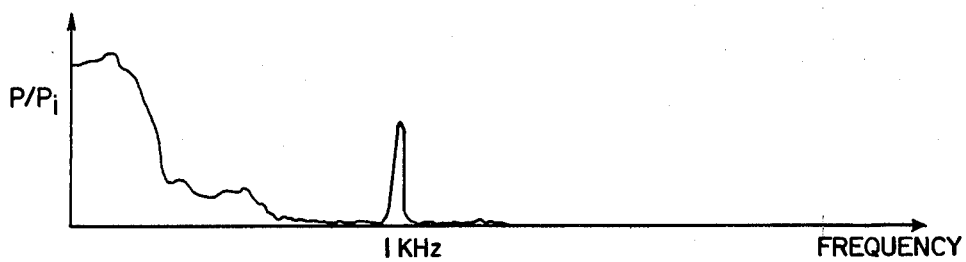
FIG. 2(e) is the normalized power vs frequency response of the system illustrating the noise window.

In essence, the present system has operated to shift the spectrum of the interference phase shift signal to a frequency significantly higher than that of the system (drift) noise. This can be seen in FIG. 2(e) where the wavelength modulation frequency and thus the spectrum location where the signal appears has been chosen as 1 KHz. Thus, the fact that the background noise of the system is greater than or equal to the signal generated by the interference phase shift caused by the rotation rate and has approximately the same frequency as the system noise, will not prevent accurate detection thereof. In essence, the interference phase shift signal has been moved to a window in the noise spectrum thereby facilitating its detection in the presence of such noise.

It should be understood that there are a variety of methods for generating light beams at a plurality of wavelengths. For example, a plurality of different wavelength light beams could be generated by generating one wavelength and the harmonics therefore. The present system could thus be implemented by generating a wavelength $\lambda_1$ and its optical second harmonic.

Obviously, many modifications and viriations of the present invention are possible in light of the above teachings. It is therefore to be understood that within the scope of the appended claims the invention may be practiced otherwise than as specifically described.

What is claimed is:

1. A Sagnac rotation measurement device comprising:
   means for generating a plurality of different beams of electromagnetic energy with each beam having a different wavelength;
   a light path circuit including a plurality of turns of optical path in or parallel to a given plane;
   means for splitting a beam into two beams and for directing one of said two beams to travel in a clockwise direction around said light path circuit and directing the other of said two beams to travel in a counter-clockwise direction around said light path circuit, and for recombining said two beams after having traversed through their respective directions in said light path circuit to produce electromagnetic wave interference;
   means for alternately gating each of said plurality of different wavelength beams from said generating means to said splitting means at a frequency substantially higher than the rates of change of phase due to rotation in the plane of said light path circuit and due to system noises; and
   means for extracting a signal at said wavelength gating frequency from said interference pattern in order to detect a rotation-caused phase change therefrom.

2. A rotation measurement device as defined in claim 1, wherein said beam generating means includes means for generating two separate wavelength beams.

3. A rotation measurement device as defined in claim 2, wherein said beam generating means comprises means for generating light at a given frequency and its second harmonic to yield two of beams each having a different wavelength.

4. A rotation measurement device as defined in claim 2, wherein said light path circuit comprises a wound length of optical fiber with each end terminating at said splitting means.

5. A rotation measurement device as defined in claim 4, wherein said optical fiber is wound in the shape of a cylindrical helix.

6. A rotation measurement device as defined in claim 5, wherein said extracting means comprises:
   a spectrum analyzer; and
   sensing means for sensing the light from the wave interference at said splitting means and generating a signal proportional thereto for application to said spectrum analyzer.

7. A rotation measurement device as defined in claim 5, wherein said extracting means comprises:
   a locking amplifier; and
   sensing means for sensing the light from the wave interference at said splitting means and generating a signal proportional thereto for application to said locking amplifier.

8. A rotation measurement device as defined in claim 1, wherein said generating means comprises a plurality of laser light sources for generating light beams with different wavelengths.

9. A rotation rate measurement device comprising:
   a conventional Sagnac interferometer disposed on a platform for generating Sagnac optical interference;
   means for generating and applying an optical beam having a time modulated wavelength to said Sagnac interferometer; and
   means for extracting a signal from said interferometer interference pattern at the time modulation rate of said optical beam wavelength in order to detect a rotation-caused phase change therefrom.

10. A rotation rate measurement device as defined in claim 9, wherein said beam generating means comprises:
    means for generating two separate wavelength beams; and
    gating means for alternately gating each of said beams to said Sagnac interferometer at a frequency substantially higher than the rate of change of phase due to rotation.

11. A rotation measurement device as defined in claim 9, wherein said beam generating means comprises:
    means for generating light at a given frequency and one harmonic thereof to yield two beams having different wavelengths; and
    gating means for alternately gating each of said beams to said Sagnac interferometer at a frequency substantially higher than the rate of change of phase due to rotation.

* * * * *